March 17, 1925.
H. H. WILLIAMS
1,529,731
REFILLABLE LUBRICATING CUP
Filed June 1, 1921    2 Sheets-Sheet 1
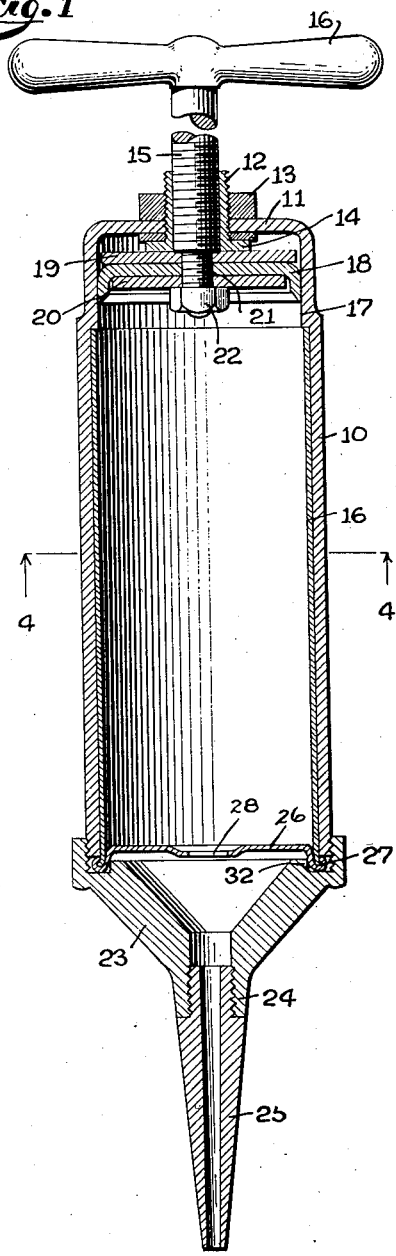
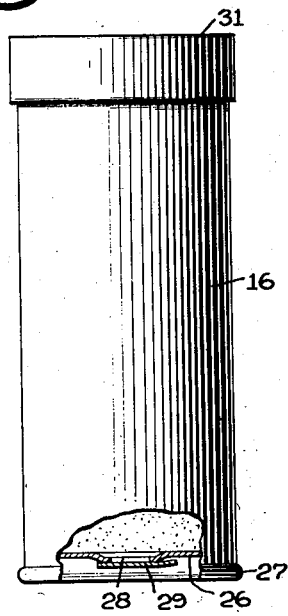
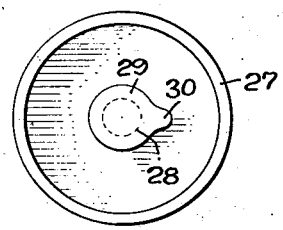
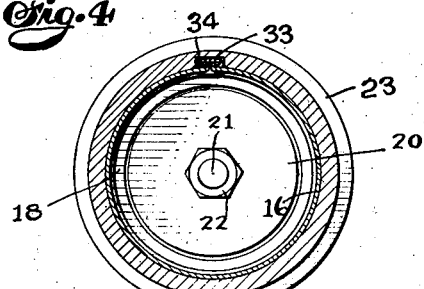
INVENTOR
Herbert H. Williams
BY
Emery, Varney, Blair & Hognet
his ATTORNEYS March 17, 1925.

H. H. WILLIAMS 1,529,731

REFILLABLE LUBRICATING CUP

Filed June 1, 1921     2 Sheets-Sheet 2

Herbert H. Williams INVENTOR

BY
Emery, Varney, Blair + Hoquet
his ATTORNEYS

Patented Mar. 17, 1925.

1,529,731

UNITED STATES PATENT OFFICE.

HERBERT H. WILLIAMS, OF BROOKLYN, NEW YORK.

REFILLABLE LUBRICATING CUP.

Application filed June 1, 1921. Serial No. 474,059.

*To all whom it may concern:*

Be it known that I, HERBERT H. WILLIAMS, a citizen of the United States, and a resident of the borough of Brooklyn, city of New York, county of Kings, and State of New York, have invented an Improvement in Refillable Lubricating Cups, of which the following is a specification.

This invention relates to lubricating devices such as grease cups or grease guns for example, and relates more particularly to refillable devices of the above mentioned character.

An object of this invention is to provide a readily refillable lubricating device adapted particularly for grease and like lubricants, and this invention aims to provide in such devices a simple and durable construction of reliable and effective action.

Another object is to provide a construction of the above mentioned character in which an individual container in which the grease or other lubricant may be commercially dispensed may be readily inserted into the lubricating device and into which the piston of the device may be made to enter readily and automatically without necessitating a troublesome and inconvenient manual manipulation of the piston or container itself.

Other objects will be in part obvious or in part pointed out hereinafter.

The invention accordingly consists in the features of construction, combination of elements and arrangement of parts which will be exemplified in the structure hereinafter described, and the scope of the application of which will be indicated in the appended claims.

In the drawings, in which is shown by way of example a preferred embodiment of this invention and in which like reference characters refer to similar parts throughout, Figure 1 is a longitudinal cross-section of a grease gun with the several parts including the container in assembled relation;

Figure 2 is a side elevation partly broken away to show certain features of the construction more clearly in cross-section;

Figure 3 is a bottom view of the container shown in Fig. 2;

Figure 4 is a cross-section on the line 4—4 of Fig. 1;

Figure 5:
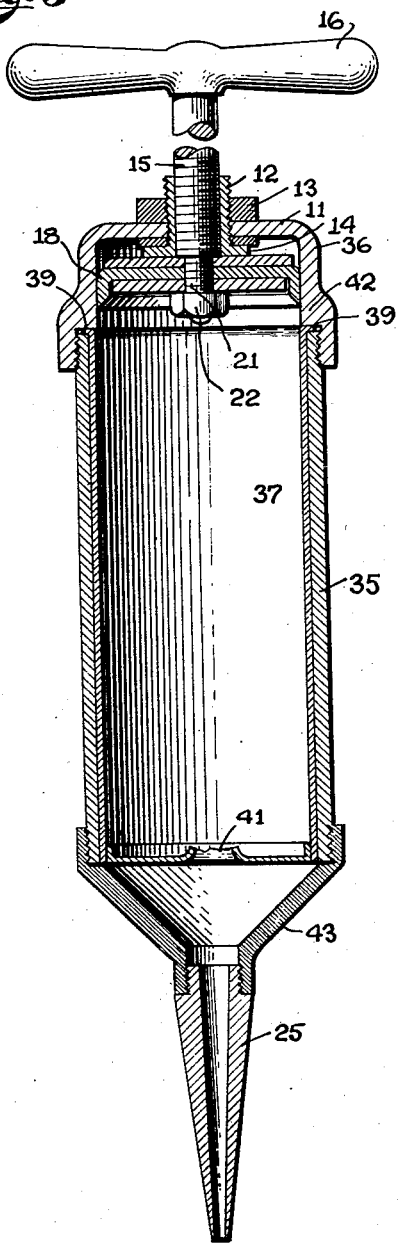
Figure 5 is a longitudinal cross-section of a modified form of grease gun showing the several parts as well as a container in assembled relation.

Referring to Fig. 1 of the drawings, there is shown by way of illustration a grease gun comprising a main body portion or main cylinder 10 closed at its upper end in any suitable manner and preferably by means of the integrally formed end member 11 in a suitable central opening of which is mounted an internally threaded bushing 12 secured to the end member 11 in any suitable manner, as by means of the nut 13 threaded upon the exterior of the bushing 12 and co-operating with a flange 14 upon the inner end of the bushing 12 to position the latter securely with respect to the end member 11.

A piston rod 15, exteriorly threaded and in threaded engagement with the bushing 12, is provided at its upper end with a handle 16 to facilitate the manual operation and has mounted at its lower or inner end a suitable piston for operation within the main body portion or cylinder 10. The cylinder 10 is of a substantially uniform interior diameter throughout substantially its greatest extent and commensurate with the exterior diameter and length of a suitable sheet metal container 16 to be hereinafter more clearly described. At its upper interior portion the cylinder 10 is reduced in its diameter, as indicated at 17, so that the diameter of this portion is substantially equal to and preferably slightly less than the inside diameter of the container 16. Returning now to the construction of the piston mounted at the lower end of the piston rod 15, the piston comprises a cup-shaped washer 18 of any suitable flexible material, such as leather for example, clamped between a washer 19 of a diameter sufficiently small to conveniently enter the upper portion 17 of the cylinder 10 of reduced diameter and a second washer 20, the several parts being mounted upon a reduced end threaded portion 21 at the end of the piston rod 15 to which they are secured by means of a nut 22 threaded upon the reduced portion 21.

The lower exterior portion of the main cylinder 10 is exteriorly threaded so as to receive the base portion 23 in threaded engagement therewith and preferably of a suitable conical shape so as to terminate at its lower end into a suitably threaded coupling 24 by means of which the entire structure may be permanently connected to the parts desired to be lubricated or into which may be threaded a nozzle 25, should it be desired to use the device as a portable grease gun.

Referring now to the structure of the container and more particularly to Figs. 2 and 3, it will be noted that I have provided a cylindrical container 16 of any suitable sheet metal or other construction provided with a bottom 26 secured to the main cylindrical portion of the container in any suitable manner, preferably by means of an interlocking seam shown more clearly in cross-section in Fig. 1 so as to provide an exterior and circumferentially extending bead 27. The bottom member 26 has preferably an opening 28 substantially centrally located and sealed by means of the sheet metal member 29 soldered to the bottom 26 and provided with an unsecured or unsoldered flap 30 by means of which the sealing member 29 may be grasped and removed from the bottom 26 so as to expose the opening 28 therein. A suitable cover 31 is provided for closing the upper end of the container 16.

The lubricant, such as grease for example, which it is desired to use, may be commercially put up and dispensed in containers of the character just described, and when it is desired to charge the grease cup or grease gun, the seal 29 is removed from the bottom member 26 to expose the exit passage 28 therein, and after removing the cover 31 at the top of the container 16, the latter is ready to be inserted into the lubricating device. The base portion 23 and the main cylinder 10 with its co-operating parts are first separated and the piston rod 15 is then manually operated so as to move the piston with its leather washer 18 to the extreme upper end of the cylinder 10 and into that upper portion 17 thereof wherein the inside diameter is reduced to substantially that of the inside diameter of the container 16. The container 16 is thereupon inserted within the cylinder 10 and will assume a position with respect thereto, as is shown in Fig. 1, in which it will be noted that the container occupies that portion of the cylinder 10 of enlarged diameter and whereby the interior walls of the container 16 will form substantially an extension of the interior wall of the upper portion 17 of the cylinder 10 into which the piston has been withdrawn. The bead 27 at the lower end of the container 16 will abut against the lower end of the cylinder 10 and upon reassembling the base portion 23 and the cylinder 10 by threading the one upon the other, the bead 27 will be securely clamped between the two parts, it being noted that the interior of the base portion 23 is provided with a flanged portion 32 extended upwardly so as to tend to enter into the lower end of the cylinder 10. By securely screwing the base portion 23 on to the lower end of the cylinder 10, the beaded seam 27 will be securely clamped both between the lower end of the cylinder 10 and the base member 23 and between the lower interior wall of the cylinder 10 and the upwardly extending flange 32 formed on the base portion 23. The seam, or other similar connection securing the bottom member 26 to the cylindrical portion of the container 16, is thus positively reinforced to withstand the pressures that may be exerted upon the bottom 26 during the action of the device and so as to prevent the disarrangement or rupture of the parts.

Upon operating the piston rod 15 to move the piston downwardly to expel the lubricant through the base portion 23, the washer 18 or equivalent structure of the piston will automatically enter the container 16 which, as hereinbefore described, has been positioned so that its interior will be in alignment with the interior portion 17 of the upper part of the cylinder 10 of reduced diameter. The piston structure which may be used, and which may include a leather washer such as the washer 18 herein shown by way of example, may be expansible and have a tendency to expand outwardly in a radial direction to hug the walls of the cylinder in which it is adapted to operate. When the piston is withdrawn into the upper portion 17 of the main cylinder 10, the reduced diameter of this portion contracts the expansible portion of the piston and prepares it for entry into the container 16 when the latter is inserted into the main cylinder. The piston, therefore, together with its expansible portion, readily enters into the container 16 containing the grease and is automatically placed into proper operative relation with respect thereto.

The cylindrical portion of the container 16 is preferably provided with an exterior seam 33, as is shown in cross-section in Fig. 4, so as to provide a substantially continuous cylindrical interior in which the piston may operate. In order to accommodate the exterior seam 33 in the cylinder 10, the latter is provided with a longitudinally extending slot 34 with which the seam 33 may be made to register upon inserting the container into the cylinder 10. It will be understood, however, that any suitable seam may be provided in place of the seam 33 as illustrated. It will be understood that I may also employ a plain or a substantially continuous bottom member for the container 16, in which case a hole of suitable size is punched therein by any suitable means before the container 16 is inserted into the cylinder 10.

Upon the container 16 within the cylinder 10 being emptied through the action of the piston, and when it is desired to replace the emptied container with a new and filled container, the base portion 23 is separated from the cylinder 10, whereupon the emptied container may be withdrawn. I prefer, however, to make the piston rod 15 of sufficient length and also threaded throughout a sufficient length to permit the piston to travel beyond the lower end of the cylinder 10 so that upon the continued downward movement of the piston rod 15, the lower end of the latter will engage the bottom 26 of the container 16 and will thus force the emptied container out of the cylinder 10 to any desired extent depending upon the length of the piston rod 15, whereupon the container, thus projecting from the lower end of the cylinder 10, may be securely grasped in any convenient manner and entirely withdrawn.

It will be noted that in the structure hereinbefore described I may make the upper end 11, in which the piston rod 15 is mounted, integral with the cylinder portion 10. But I may mount the piston rod 15 in a detachable cap which may be threaded onto the upper end of the main cylinder, as I have illustrated in Fig. 5 in which there is shown an illustrative modification of my invention embodying certain features and advantages as will be hereinafter set forth.

Referring now to Fig. 5, I have provided a main cylinder portion 35 exteriorly threaded at both its upper and lower ends so as to receive at its upper end the cap 36 in which is mounted a piston structure substantially similar to that described in connection with Fig. 1. In Fig. 5 like parts of the piston structure, as well as the parts mounting the structure upon the cap 36, are designated by similar reference characters corresponding to the like parts shown in Fig. 1.

Figure 6:
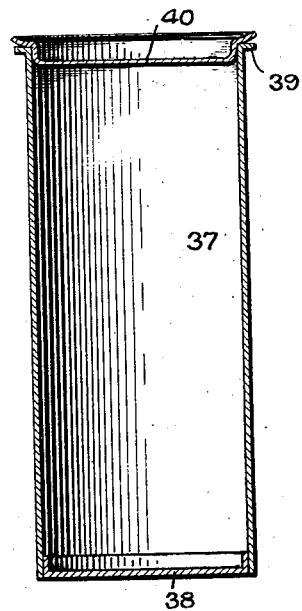
Figure 6 is a longitudinal cross-section of a form of container particularly adapted to be used in connection with the form of my invention illustrated in Fig. 5.

The cylinder portion 35 is adapted to receive the container 37 shown more clearly in longitudinal section in Fig. 6, wherein it will be seen that the lower end of the container 37 is closed by means of the bottom member 38 suitably secured thereto as by soldering for example, and that the upper end of the container 37, provided with an outwardly extending flange 39, is closed by means of the cap 40 which is adapted to be held frictionally in closing position. The container 37 upon having its friction cap 40 removed therefrom is inserted into the cylinder 35, the cap member 36 having been previously removed from the cylinder 35 and a suitable hole, indicated at 41, having been previously punched through the bottom member 38 of the container by any suitable tool.

Upon inserting the container 37 within the cylinder 35, the flange 39 of the container will rest upon the upper end surface of the cylinder 35 so that upon replacement of the cap 36 upon the cylinder 35, the shoulder 42 upon the interior of the cap 36 will securely clamp the container in position within the cylinder 35. The inside diameter of the substantially cylindrically shaped cap 36 is made preferably slightly less than, or substantially equal to, the inside diameter of the container 37 so that the flexible piston member 18 will be suitably contracted upon the withdrawal of the piston into the cap 36 to permit a ready and convenient entry of the piston into the container 37 which thereafter functions as the cylinder in which the piston operates to expel the lubricant through the opening 41.

Upon the lower threaded portion of the cylinder 35 is detachably secured a base portion 43 preferably conically shaped so as to guide and direct the lubricant expelled through the opening 41 of the container to the parts desired to be lubricated or through a nozzle portion 25 suitably secured at the lower end of the base portion 43.

The relative diameters of the container 37 and the cylinder 35 are preferably such that the container rests substantially loosely within the cylinder so as to accommodate irregularities which may occur in the contour of either, and the inside diameter of the cap 36 is preferably made slightly less than the inside diameter of the container so that the expansible piston portion may readily enter the container irrespective of the looseness with which the container fits within the cylinder. If the container 37 is made with an exterior seam, such as seam 33 of the container 16 shown in Fig. 4, the cylinder 35 is provided with a longitudinally extending groove or slot substantially similar to the slot 34 in the cylinder 10 shown in Fig. 4.

When it is desired to remove the container 37 from the cylinder 35 after the former has been emptied of its contents, the piston structure is withdrawn into the cap 36 so as to prepare the expansible piston portion for entry into the next container to be inserted, whereupon the cap 36 with its piston structure is detached from the cylinder portion 35. Since the container preferably fits loosely within the cylinder, the container may thereupon be readily withdrawn. In case, however, the container is jammed or for other reasons cannot be readily withdrawn from the cylinder 35, the base portion 43 is removed from the cylinder and the cap 36 with its associated piston structure is attached in place of the base portion 43. The various threaded portions of the several parts are for this purpose made of the same pitch of thread. The piston may then be manually operated to enter the cylinder 35 from its lower end whereupon the piston, acting through the nut 22, engages the bottom 38 of the container and forces the latter out of the cylinder.

As hereinbefore stated, I may employ a detachable cap, such as a cap 36 in Fig. 5, for mounting the piston structure with respect to the container 16 and the cylinder 10 of Fig. 1, in which case the lower end of the cap 36 having a smaller inside diameter than the inside diameter of the cylinder 10 will form the abutment against which the upper end of the container 16 may rest. Such a construction in connection with Fig. 1 may be desirable where greater facility of access to the several parts or where, perhaps, greater convenience in manufacture may be desired. Under certain circumstances it may be desirable not to employ a flange such as the flange 39 on the container 37 and when the flange is thus dispensed with the container 37 may be expelled from the cylinder 35 when the contents of the former have been consumed by removing the base member 43 and continuing the movement of the piston member. The latter will thereupon engage the bottom of the container 37 and force the container out of the cylinder, the piston rod 15 being in this case made of sufficient length to permit the desired range of movement to take place.

It will thus be seen that I have provided in this invention a grease gun or grease cup construction in which the several objects of this invention, as well as many advantages, have been attained, and it will also be noted that the structure herein provided is simple and positive in its operation and of exceedingly convenient manipulation.

As various possible embodiments may be made of the above invention and as various changes might be made in the embodiment above set forth, it is to be understood that all matter herein set forth or shown in the accompanying drawings is to be interpreted as illustrative and not in a limiting sense.

I claim:

1. In a device of the character described a container adapted to receive a lubricant open at its upper end and provided with an apertured bottom seamed thereto to form an outwardly extending head to provide reinforcement for said container when used in a grease gun.

2. In a device of the character described a cylindrical container having an exterior longitudinally extending seam adapted to be inserted in a grease gun, said seam providing additional reinforcement and a smooth interior when secured in said grease gun.

3. In a device of the kind described a cylindrical container having a closed end and an open end, said open end being provided with a flange seating a removable closure said flange forming a means for strengthening and positioning said cylinder in a grease gun.

4. In a device of the kind described a cylindrical container adapted for use in a grease gun, said cylinder having an open end closed by a removable closure and a closed end having the closure seamed to said cylinder, said closure having a discharge opening closed by a removable closure.

In testimony whereof, I have signed my name to this specification this 31st day of May, 1921.

HERBERT H. WILLIAMS.